(12) United States Patent
Huang et al.

(10) Patent No.: US 6,576,840 B1
(45) Date of Patent: Jun. 10, 2003

(54) STRUCTURE FOR PROTECTING AND GUIDING FLAT CABLE OF TRAVELING MODULE

(75) Inventors: Yin-Chun Huang; Chih-Wen Huang, both of Hsinchu; Jen-Shou Tseng, Miaoli Hsien, all of (TW)

(73) Assignee: Umax Data Systems Inc., Hsinchu (TW)

( * ) Notice: Subject to any disclaimer, the term of this patent is extended or adjusted under 35 U.S.C. 154(b) by 0 days.

(21) Appl. No.: 09/392,561

(22) Filed: Sep. 9, 1999

(51) Int. Cl.[7] ................................................ H01B 7/06
(52) U.S. Cl. ........................................ 174/69; 174/191
(58) Field of Search ...................... 174/69, 59, 191, 174/DIG. 9, DIG. 26.9

(56) References Cited

U.S. PATENT DOCUMENTS 4,987,442 A * 1/1991 Uemori ...................... 355/50
6,196,855 B1 * 3/2001 Huang ........................ 439/162

* cited by examiner

*Primary Examiner*—Rajnikant Patel
(74) *Attorney, Agent, or Firm*—Dennison, Schultz & Dougherty

(57) ABSTRACT

A structure for protecting and guiding a flat cable connected between a traveling module and a protective cover of a scanner is disclosed. The protective structure includes an anti-bending member mounted onto the traveling module for preventing the flat cable from being over-bent at its first end. A guide channel member is disposed on the protective cover under the flat cable and along the moving direction of the traveling module for guiding the flat cable during moving of the traveling module and preventing the flat cable from being swung left and right. The second end of the flat cable is extended into the protective cover via a protective sheath fitted on the cover for preventing the second end of the flat cable from excess bending angle and keep the flat cable smoothly moving without deflection.

2 Claims, 6 Drawing Sheets

STRUCTURE FOR PROTECTING AND GUIDING FLAT CABLE OF TRAVELING MODULE

BACKGROUND OF THE INVENTION

1. Field of the Invention

The present invention relates to a protective structure for a flat cable, and more particularly to a structure for protecting and guiding a flat cable connected between a traveling module and a cover arranged in an image scanning device.

2. Description of the Prior Art

In various kinds of optical devices or electric appliances (such as image scanner, photo copier, test instrument, etc.), there is often equipped with traveling modules therein. For example, as shown in FIG. 1, it is a perspective view of a conventional image scanning device, showing that a focusing lens 2, a protective cover 3, a pair of corresponding guide rods 4a, 4b, and two movable traveling modules 5a 5b are arranged in the housing 1 of the conventional optical image scanner.

The guide rods 4a, 4b serve as a guiding mechanism for guiding two traveling modules 5a, 5b. The first traveling module 5a carries a light tube as a light source for the image scanning device, while the second traveling module 5b carries a set of reflection mirrors for reflecting the light projected from the light source.

During scanning, a document to be scanned is placed on a document positioning plate of the scanner. It is known that the document positioning plate is a plane surface made of for example glass or other light transmittable, substantially rigid material, for supporting a document to be scanned. The light tube of the first traveling module 5a projects a light toward the document and then the light is reflected by the reflection mirror mounted in the second traveling module 5b.

The first and second traveling modules 5a, 5b are arranged to achieve a necessary scanning optical path during scanning. Typically, the first and second traveling modules 5a, 5b may be moved by a conventional driving motor via a transmission rope (not shown). In general, the ratio of the speed of the first traveling module 5a to the speed of the second traveling module 5b is 2:1.

In general, a flat cable 6 is connected between the traveling module 5a and the protective cover 3. The protective cover 3 contains therein a circuit board and relevant electronic components. One end of the flat cable 6 is connected to a connector socket 61 of the traveling module 5a, and the other end of the flat cable 6 is extended into the protective cover 3 via an opening 31 formed on the protective cover 3. So, the traveling module 5a can via the flat cable 6 obtains necessary controlling signals and electric power source from the electronic components arranged in the protective cover 3.

Generally, in order to minimize the length of the flat cable, the opening 31 on the protective cover 3 is located at a substantially middle section of the scanner.

Due to the material of the flat cable 6 itself, in the using regulation, the minimum curvature radius and the tolerable number of bending time of the flat cable 6 are limited. Under the connection structure of the conventional flat cable described above, since the traveling module 5a needs to frequently move left and right, the flat cable 6 will be repeatedly bent during scanning. In the case of excess bending angle, the flat cable 6 may be broken or damaged. Moreover, the width of the existing flat cable is narrower and narrower (the number of pins is reduced) with longer length (such as used in scanning of A3 size document). Therefore, during the movement of the traveling modules, the flat cable is likely to curve and touch other components (such as the bottom surface of the document positioning plate of the scanner). In addition, the flat cable may swing left and right during movement of the traveling modules. These all lead to lowered reliability and shortened using life of the scanner.

SUMMARY OF THE INVENTION

It is therefore a primary object of the present invention to provide a protective structure for preventing the flat cable of the traveling module from bending by an excess bending angle. Therefore, during the displacement of the traveling module, the end section of the flat cable is protected from being damaged due to excess bending angle.

It is a further object of the present invention to provide the above protective structure which is able to make the flat cable smoothly bent without collision and abrasion during movement of the traveling module.

It is still a further object of the present invention to provide the above protective structure which is able to guide the flat cable to smoothly move along with the traveling module without deflection.

To achieve the objects above, the protective structure in accordance with a preferred embodiment of the present invention includes an anti-bending member mounted onto the traveling module for preventing the flat cable from being over-bent at its first end. In addition, a guide channel member is disposed on the protective cover under the flat cable and along the moving direction of the traveling module for guiding the flat cable during moving of the traveling module and preventing the flat cable from being swung left and right. The second end of the flat cable is extended into the protective cover via a protective sheath fitted on the cover for preventing the second end of the flat cable from excess bending angle and keep the flat cable smoothly moving without deflection.

The present invention can be best understood through the following description and accompanying drawings wherein:

DETAILED DESCRIPTION OF THE PREFERRED EMBODIMENT

Figure 1:
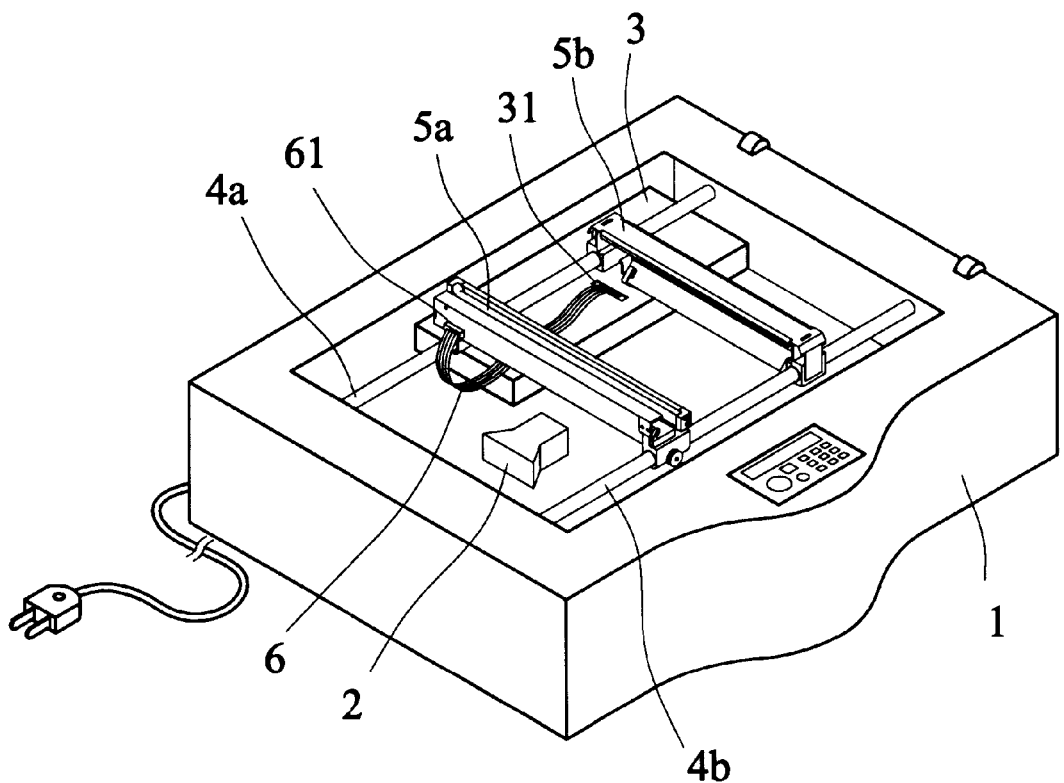
FIG. 1 is a perspective view of a conventional scanner.
Figure 2:
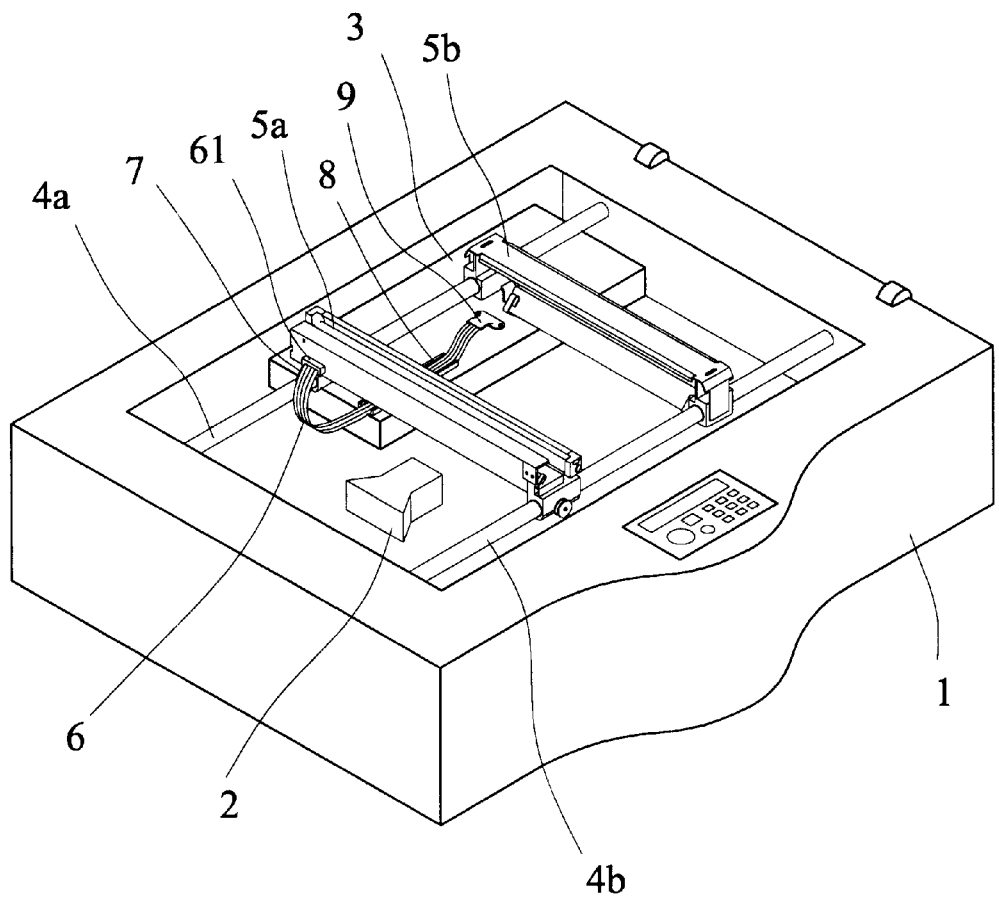
FIG. 2 is a perspective view showing that the present invention is applied to a scanner.

With reference to FIG. 2, it is a perspective view showing that the protective structure is applied to an optical image scanning device in accordance with a preferred embodiment of the present invention. In the housing 1 of the scanner, there are provided with a focusing lens 2, a protective cover 3, two corresponding guide rods 4a, 4b, two traveling modules 5a, 5b and a flat cable 6. The first end of the flat cable 6 is connected to the connector socket 61 of the travelling module 5a, and the second end of the flat cable 6 is extended into the protective cover 3 via an opening formed on the protective cover 3.

An anti-bending member 7 is additionally mounted on a side wall of the traveling module 5a in accordance with the preferred embodiment of the present invention. The anti-bending member 7 serves to prevent the flat cable 6 from being bent by an excess bending angle at this end section.

Figure 3:
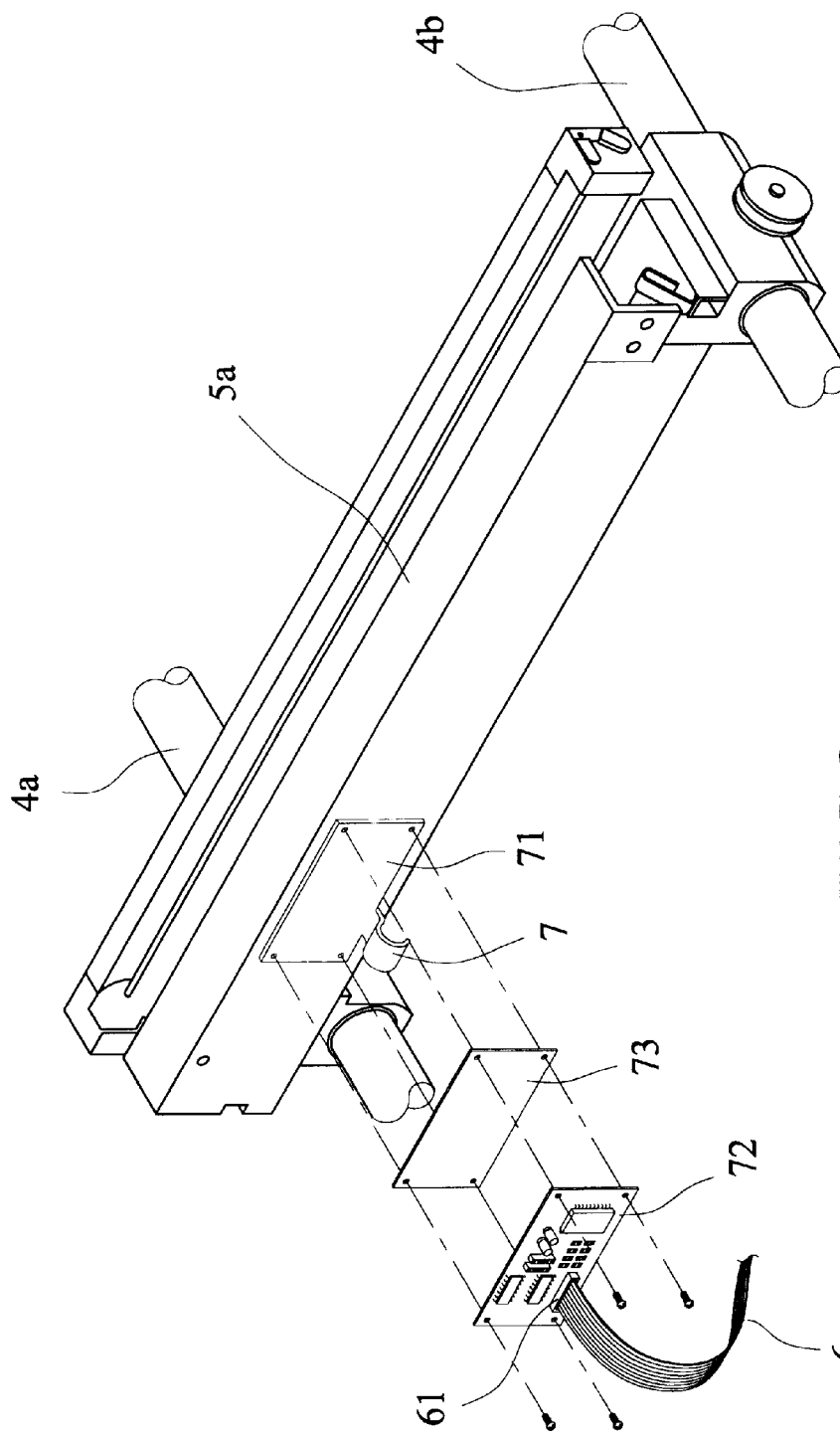
FIG. 3 is a perspective exploded view showing the anti-bending member of the present invention is mounted on a side wall of the traveling module.

Referring to FIG. 3, the anti-bending member 7 has an arch section and integrally extends from a bottom edge of a fixing board 71. A circuit board 72 disposed with a connector socket 61 together with an insulating board 73 and the fixing board 71 is fixed on the front side wall of the traveling module 5a by conventional fixing measure such as screws. After these components are assembled, the first end of the flat cable 6 is inserted into a connector socket 61 on the circuit board 72. At this time, the end section of the flat cable 6 is supported on the arch section of the anti-bending member 7. By means of the anti-bending member 7, when the flat cable 6 is subject to a pulling force, the bending angle of the flat cable 6 is limited by the arch section of the anti-bending member 7 and thus the flat cable 6 is prevented from being bent by an excess bending angle.

In addition, a guide channel member 8 is arranged on the protective cover 3 under the flat cable 3 and along the moving direction of the traveling module 5a in accordance with the preferred embodiment of the present invention. Therefore, when the traveling module 5a displaces, the guide channel member 8 serves to guide the flat cable 6 to bend smoothly without deflection.

Figure 4:
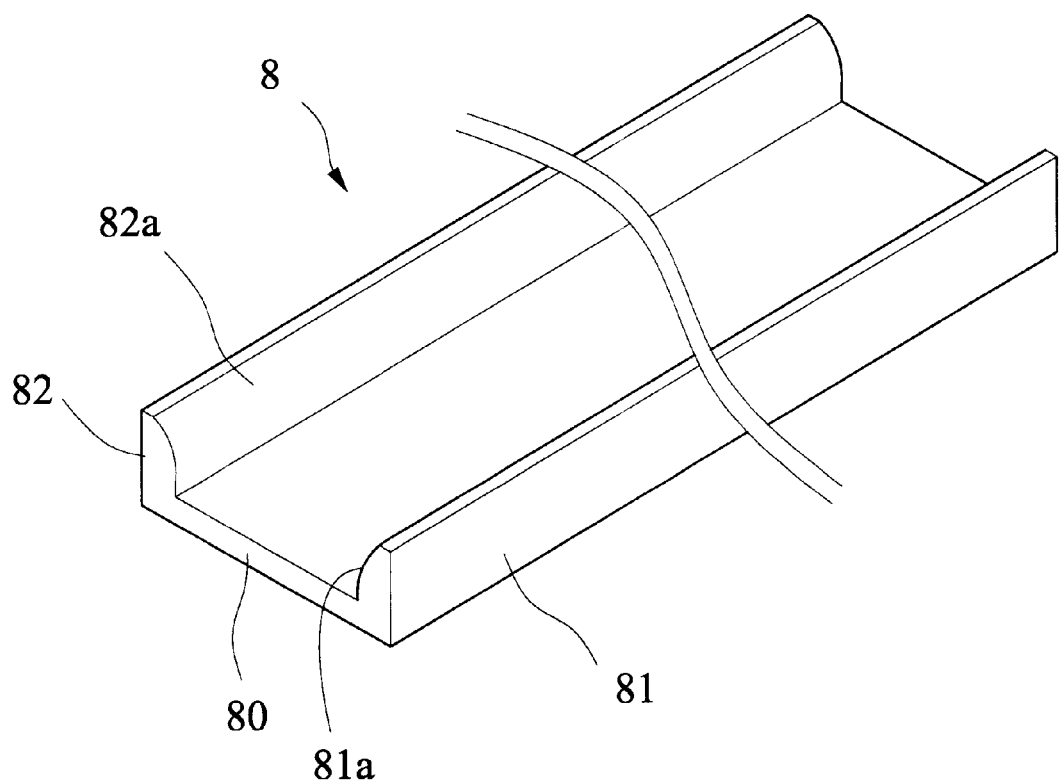
FIG. 4 is a perspective enlarged view of the guide channel structure of the present invention.

FIG. 4 is an enlarged view of the guide channel member 8 which includes a guide channel base seat 80 and two vertical guide walls 81, 82 formed on two lateral edges of the base seat 80. The vertical guide walls 81, 82 are respectively formed with arch inner wall surfaces 81a, 82a defining a guiding structure for guiding the flat cable without intervening with the passing of the flat cable through the channel member 8.

Figure 5:
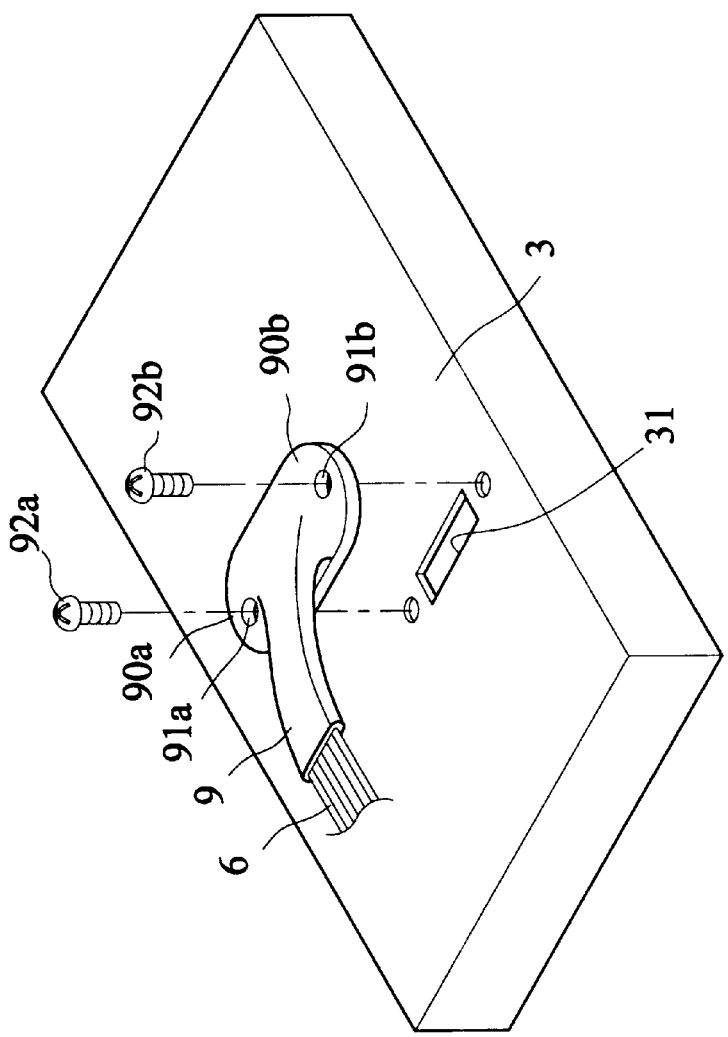
FIG. 5 is a perspective enlarged view of the protective sheath of the present invention.

Furthermore, a protective sheath 9 is additionally located at the opening 31 formed on the protective cover 3 in accordance with the preferred embodiment of the present invention. FIG. 5 is an enlarged view of the protective sheath 9, showing that the protective sheath 9 is separated from the protective cover 3. The second end of the flat cable 6 is extended into the protective cover 3 via the protective sheath 9 and the opening 31 formed on the protective cover 3 in sequence, and then electrically connect with the circuit board (not shown) arranged in the protective cover 3.

When the flat cable 6 moves along with the traveling module 5a, the protective sheath 9 serves to keep the flat cable 6 smoothly moving without deflection and prevent the second section of the flat cable 6 from being bent by an excess bending angle.

As shown in FIG. 5, the protective sheath 9 is provided with two wings 90a, 90b extend from two bottom sides of the protective sheath 9. Two screws 92a, 92b are respectively passed through holes 91a, 92b formed on the wings 90a, 90b to lock the protective sheath 9 on the protective cover 3 at location of the opening 31.

Figure 6A:
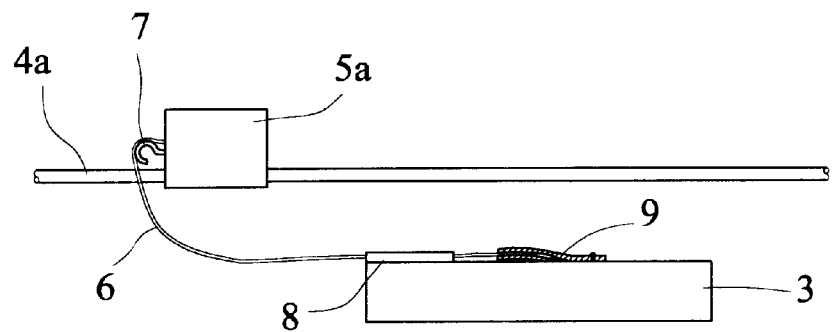
FIG. 6A is a side view showing that the traveling module is positioned on a left side of the protective cover of the present invention.

FIG. 6A shows that the traveling module 5a is positioned on left side of the protective cover 3. At this position, the first end of the flat cable 6 is supported by the anti-bending member 7 so that the flat cable 6 is prevented from being over-bent at the first end section. The guide channel member 8 is just positioned at a substantially middle section of the flat cable 6 and extends in a direction of the flat cable 6, so that by means of its own weight and flexibility, the flat cable 6 can smoothly attach with the guide channel member 8.

Figure 6B:
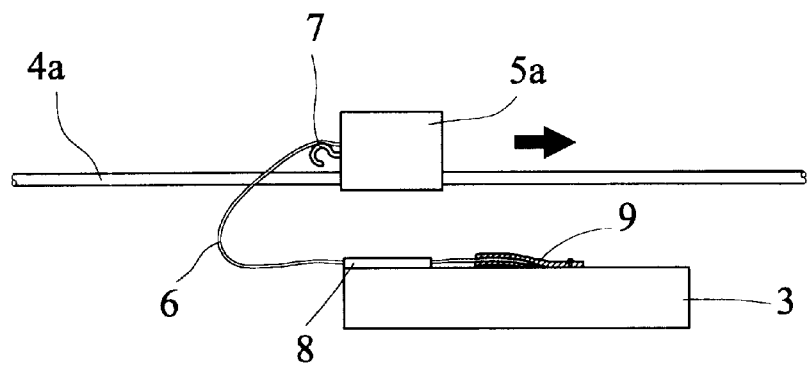
FIG. 6B is a side view showing that the traveling module 5a moves rightward to an upper position on the protective cover 3.

FIG. 6B shows that the traveling module 5a moves rightward to an upper position on the protective cover 3. At this time, the flat cable 6 is still able to smoothly attach with the guide channel member 8 and is guided thereby, so that the flat cable 6 is prevented from being swung left and right.

Figure 6C:
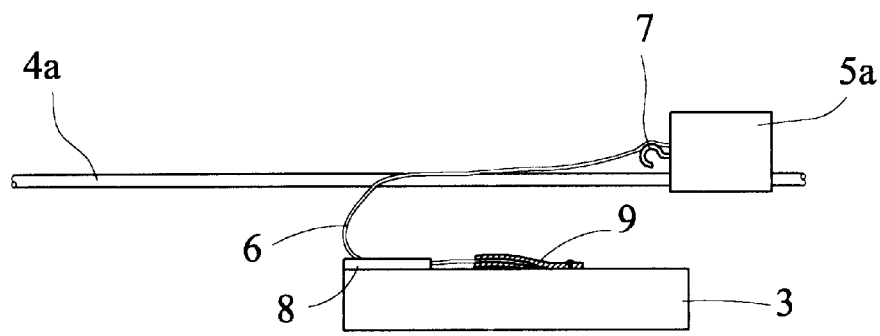
FIG. 6C is a side view showing that the traveling module is positioned on a right side of the protective cover of the present invention.

When the traveling module 5a further moves rightward to a right side position of the protective cover 3, as shown in FIG. 6C, the middle second of the flat cable 6 is pulled and may partially separate from the guide channel member 8. However, most portions of the flat cable 6 can still attach with the guide channel member 8 and can be guided thereby. Therefore, the flat cable 6 is still prevented from swinging left and right. When the traveling module 5a is moved to the right dead end, by means of the protective sheath 9, the flat cable 6 is prevented from being bent by excess bending angle at its second end section. Also, the problem of left and right swinging of the flat cable 6 taking place during movement of the traveling module 5a can be solved.

The above embodiment is only used to illustrate the present invention, not intended to limit the scope thereof. Many modifications of the above embodiment can be made without departing from the spirit of the present invention.

What is claimed is:

1. A structure for protecting and guiding a flat cable, said structure comprising a housing, a cover and a traveling module movable in said housing with respect to said cover and a flat cable having a first end connected to said traveling module and a second end extending and fixed to said cover, an anti-bending member mounted on said traveling module under said flat cable for preventing the flat cable from being over-bent, said anti-bending member including a fixing board fixed to said traveling module and an arch shaped section extending from said fixing board whereby the flat cable is positioned with respect to the arch shaped section of said anti-bending member, and a protective sheath mounted on said cover with said second end of said flat cable extending into said cover via said protective sheath and a guide channel member formed on said cover under said flat cable and along a moving direction of said traveling module.

2. The structure according to claim 1 wherein said guide channel member comprises a guide channel base seat having two lateral edges and two vertical guide walls respectively formed on said lateral edges of said base seat and each of said guide walls formed with arch shaped inner wall surfaces.

* * * * *